(12) United States Patent
Duyvesteyn

(10) Patent No.: US 11,673,812 B2
(45) Date of Patent: Jun. 13, 2023

(54) COUNTERCURRENT PROCESS FOR RECOVERING HIGH PURITY COPPER SULFATE VALUES FROM LOW GRADE ORES

(71) Applicant: Scandium International Mining Corp., Sparks, NV (US)

(72) Inventor: Willem P. C. Duyvesteyn, Reno, NV (US)

(73) Assignee: Scandium International Mining Corporation, Sparks, NV (US)

( * ) Notice: Subject to any disclaimer, the term of this patent is extended or adjusted under 35 U.S.C. 154(b) by 7 days.

(21) Appl. No.: 16/994,625

(22) Filed: Aug. 16, 2020

(65) Prior Publication Data

US 2021/0347651 A1    Nov. 11, 2021

Related U.S. Application Data

(60) Provisional application No. 62/886,966, filed on Aug. 15, 2019.

(51) Int. Cl.
| | | |
|---|---|---|
| *C01F 11/00* | (2006.01) | |
| *C01F 11/46* | (2006.01) | |

(Continued)

(52) U.S. Cl.
CPC .......... *C01F 11/468* (2013.01); *B01J 47/026* (2013.01); *C22B 3/08* (2013.01); *C22B 3/42* (2013.01);

(Continued)

(58) Field of Classification Search
CPC . C01F 11/468; C22B 3/08; C22B 3/42; C22B 15/0071; B01J 47/00; B01J 47/026;

(Continued)

(56) References Cited

U.S. PATENT DOCUMENTS 3,214,239 A    10/1965  Hazen et al.
5,049,363 A     9/1991  Feuling
(Continued)

OTHER PUBLICATIONS

Angelov, T. et al. (2000). The Successful Commercial Implementation of the Combined Leach—Ion Exchange—Solvent Extraction—Electrowinning Process at the Bucim Copper Project. University of Mining and Geology "St. Ivan Rilski", Bulgaria.

(Continued)

*Primary Examiner* — Steven J Bos
(74) *Attorney, Agent, or Firm* — John A. Fortkort; Fortkort & Houston PC

(57) ABSTRACT

A method for extracting copper values from a low grade copper ore feedstock is provided. The method includes (a) providing an ore feedstock of a copper oxide ore; (b) subjecting the ore to at least one process selected from the group consisting of primary crushing processes and secondary crushing processes; (c) subjecting the ore feedstock to high pressure grinding roll crushing, thereby obtaining a crushed ore; (d) subjecting the crushed ore to acid curing, thereby obtaining a cured ore; (e) subjecting the cured ore to vat or heap leaching, thus yielding a leachate; (f) passing the leachate through a first ion exchange resin which is selective to base metals plus copper, thereby removing a portion of the copper values from the leachate and yielding a first loaded resin and a first treated leachate; (g) stripping base metals plus copper values from the first loaded resin with a first stripping solution, thereby yielding a base metals plus copper-loaded stripping solution; (h) selectively extracting copper values from the copper-loaded stripping solution via solvent extraction, thereby obtaining an extract and a raffinate; and (i) crystallizing a copper salt from the extract, thereby obtaining a crystallized copper salt.

28 Claims, 3 Drawing Sheets

(51) Int. Cl.
*C22B 3/08* (2006.01)
*C22B 15/00* (2006.01)
*B01J 47/026* (2017.01)
*C22B 3/42* (2006.01)

(52) U.S. Cl.
CPC ...... *C22B 15/0071* (2013.01); *C01P 2006/82* (2013.01)

(58) Field of Classification Search
CPC ....... C01P 2006/82; C01G 3/10; C01G 3/003; C01G 3/24; C01G 3/26; C01G 3/42; C01G 3/44
USPC .......................................................... 423/24
See application file for complete search history.

(56) References Cited

U.S. PATENT DOCUMENTS

| | | |
|---|---|---|
| 6,440,383 B1 | 8/2002 | Duyvesteyn et al. |
| 8,372,367 B2 | 2/2013 | Duyvesteyn |
| 8,986,424 B2 | 3/2015 | Nebeker |
| 9,068,247 B2 | 6/2015 | Marston et al. |
| 9,410,227 B2 | 8/2016 | Boudreault et al. |
| 9,677,155 B2 | 6/2017 | Mihaylov et al. |
| 9,982,325 B2 | 5/2018 | Duyvesteyn |
| 9,982,326 B2 | 5/2018 | Duyvesteyn |
| 2006/0222580 A1 | 10/2006 | Tinkler et al. |
| 2011/0298270 A1 | 12/2011 | Duyvesteyn |
| 2012/0204680 A1 | 8/2012 | Duyvesteyn |
| 2012/0207656 A1 | 8/2012 | Duyvesteyn |
| 2012/0263637 A1 | 10/2012 | Duyvesteyn |
| 2015/0104361 A1 | 4/2015 | Boudreault et al. |
| 2015/0307966 A1 | 10/2015 | Voight et al. |
| 2016/0153070 A1 | 6/2016 | Duyvesteyn |
| 2016/0289795 A1 | 10/2016 | Duyvesteyn |
| 2018/0030577 A1 | 2/2018 | Duyvesteyn |

OTHER PUBLICATIONS

Copp, R. (2016). Recovery of Yttrium and Neodymium From Copper Pregnant Leach Solutions by Solvent Extraction. The University of Arizona.

Sole, K. et al. (2016). Recovery of copper from Chilean mine waste waters. Mining Meets Water—Conflicts and Solutions IMWA 2016 Proceedings.

Sole, K. et al. (2016). Present and future applications of ion exchange in hydrometallurgy: An overview. Society of Chemical Industry—IEx 2016 Proceedings.

Kordosky, G.A. (2002). Copper recovery using leach/solvent extraction/electrowinning technology: Forty years of innovation, 2.2 million tonnes of copper annually. The Journal of The South African Institute of Mining and Metallurgy.

Lu, B. C., Graydon, W. F. (1954). The Rate Of Dissolution Of Copper. Canadian Journal of Chemistry, 32(2), 153-163. doi: 10.1139/v54-022.

COUNTERCURRENT PROCESS FOR RECOVERING HIGH PURITY COPPER SULFATE VALUES FROM LOW GRADE ORES

CROSS-REFERENCE TO RELATED APPLICATION

This application claims the benefit of priority from U.S. provisional application No. 62/886,966, filed Aug. 15, 2019, having the same inventor, and the same title, and which is incorporated herein by reference in its entirety.

FIELD OF THE DISCLOSURE

The present disclosure relates generally to systems and methodologies for the recovery of copper values, and more particularly to systems and methodologies for the production of copper sulfate from low grade copper ores.

BACKGROUND OF THE DISCLOSURE

Most of the world's copper supply is produced from copper oxide and copper sulfide ores. The process by which copper is extracted from these ores depends on the ore type. Thus, as seen in FIG. 1, copper is typically extracted from copper sulfide ores through mineral processing and pyrometallurgical processes, while copper is extracted from copper oxide ores through hydrometallurgical processes.

The hydrometallurgical processes commonly utilized to extract copper values from copper oxide ores typically involve leaching, solvent extraction and electrowinning. These processes are described, for example, in the article by G. A. Kordosky entitled "Copper recovery using leach/solvent extraction/electrowinning technology: Forty years of innovation, 2.2 million tonnes of copper annually", The Journal of The South African Institute of Mining and Metallurgy, pp. 445-450 (November/December 2002).

Copper oxide ores are typically low grade ores (that is, they contain less than 0.5% copper by weight). Low-grade copper ores are becoming increasingly important to metal production, due to increasing metal prices and the depletion of high-grade, low-impurity ore formations.

The industry has used the same basic solvent extraction processes in the treatment of copper oxide ores for the last several decades. The economics of this process depend largely on ore grade. Over the years, this has led to the preferential working of deposits having higher ore grades. Consequently, available copper ore grades have been steadily falling over time as such higher grade deposits have been depleted. At present, the levels of copper found in many available copper oxide deposits is quite low (~0.4-~0.2% Cu). As a result, leach solution grades have decreased significantly and the solvent extraction processes prevalent in the industry have become increasing less economical. There is thus a need in the art for improved systems and processes that can derive copper values from low grade ores with more favorable economics.

Initial leaching technologies included a leaching carried out in large mostly concrete vats ("vat leaching"). With the development of solvent extraction to concentrate copper values for electrowinning, it was found that vat leach solutions tended to contain significant quantities of suspended solids, which can make solvent extraction unworkable. Therefore, heap leaching was used, and included large ponds for suspended solids settling.

The electric vehicle industry has recently demanded the availability of large quantities of very pure copper sulfate. This copper sulfate is used to produce high quality copper metal as copper is a major component in the electric motors, batteries, inverters, and wiring used in electronic vehicles. For example, a pure electric vehicle can contain more than a mile of copper wiring in its stator windings. Significant amounts of copper are also required for the charging stations for these vehicles. The increasing demand for electric vehicles will thus significantly impact the market for copper in general, and copper sulfate in particular.

For some time, most copper sulfate has been produced by dissolving high purity copper metal into sulfuric acid in accordance with the following reactions (see Benjamin C.-Y. Lu and W. F. Graydon, "The Rate Of Dissolution Of Copper", Canadian Journal of Chemistry, Vol. 32, pp. 153-163 (2011), available online at www.nrcresearchpress.com/doi/pdf/10.1139/v$_{54}$-022):

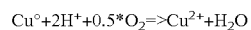

or

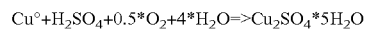

Hence, copper sulfate pentahydrate commands a significant premium in the marketplace.

SUMMARY OF THE DISCLOSURE

In one aspect, a method is provided for extracting copper values from a low grade copper ore feedstock. The method comprises (a) providing an ore feedstock of a copper oxide ore; (b) carrying out at least one of a primary and secondary crushing step to reduce the particle size of the ore feedstock, thereby obtaining a reduced size ore feedstock; (b) subjecting the reduced size ore feedstock to high pressure grinding roll crushing, thereby obtaining crushed ore (with many micro cracks); (c) subjecting the crushed ore to acid curing, thereby obtaining a cured ore; (d) subjecting the cured ore to vat or heap leaching, thus yielding a leachate; (e) passing the leachate through a first ion exchange resin which is selective to base metals and copper in particular, thereby removing most of the copper values from the leachate and yielding a first loaded resin and a first treated leachate; (f) stripping base metal plus copper values from the first loaded resin with a first stripping solution, thereby yielding a base metal plus copper-loaded stripping solution; (g) selectively extracting only copper values from the base metal plus copper-loaded stripping eluate solution via solvent extraction, thereby obtaining an extract and a raffinate; and (h) crystallizing a high purity copper salt from the extract, thereby obtaining a high quality crystallized copper salt.

In another aspect, a method for extracting copper values from a copper ore feedstock is provided. The method comprises providing an ore feedstock of a low grade crushed copper oxide ore; and recovering copper values from the ore feedstock through a process involving the sequence of processing steps (A) leaching, (B) ion exchange, (C) solvent extraction, and (D) crystallization; wherein step A generates a product having a higher wt % of copper than the ore feedstock; wherein each of steps B-D generates a product having a higher wt % of copper than the previous step in the sequence of processing steps; and wherein each of steps B-D involves the creation of an acid solution having a lower ratio $w_a/w_{Cu}$ than the previous step in the sequence of processing steps, where $w_a$ is the wt % acid and $w_{Cu}$ is the wt % copper in the acid solution generated, and wherein the acid solution generated by each of steps B-D is used in the leaching step of a subsequent iteration of the step of recovering copper values from the ore feedstock.

DETAILED DESCRIPTION

Figure 1:
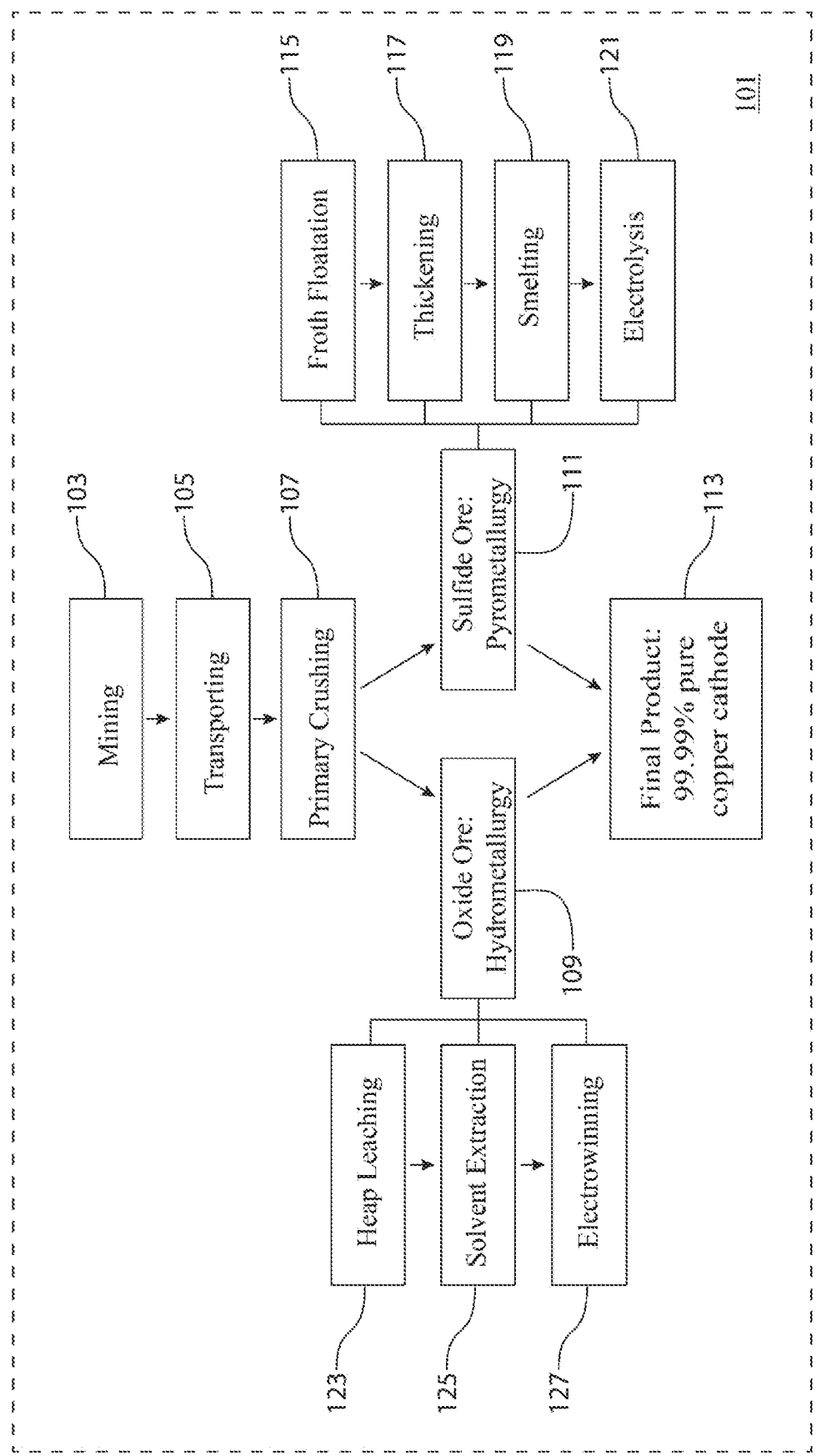
FIG. 1 is a flowchart depicting the two main processes known to the art from recovering copper values from copper oxide and copper sulfide ores.

The current approach in the art to recovering copper values from ore feedstocks depends on whether the ore is a copper oxide ore or a copper sulfide ore. FIG. 1 depicts the overall process flow. As seen therein, regardless of the ore type, the process 101 typically commences with mining 103, transportation 105 and primary crushing 107. If the ore is an oxide ore, then it is subject to hydrometallurgical processing 109. As noted above with respect to the G. A. Kordosky reference, this processing typically involves heap leaching 123, solvent extraction 125 and electrowinning 127. If the ore is a sulfide ore, then it is subject to pyrometallurgical processing 111. This processing typically involves froth flotation 115, thickening 117, smelting 119 and electrolysis 121. Both hydrometallurgical processing 109 and pyrometallurgical processing 111 are capable of yielding a final product 113 that is about 99.99% pure.

As previously noted, the economics of the process 101 depicted in FIG. 1 depend largely on ore grade, and available copper ore grades have been steadily falling over time. At present, the levels of copper found in many available copper oxide deposits is quite low, thus making the process of FIG. 1 less economical. There is thus a need in the art for improved systems and processes that can derive copper values from low grade ores with more favorable economics.

Figure 2:
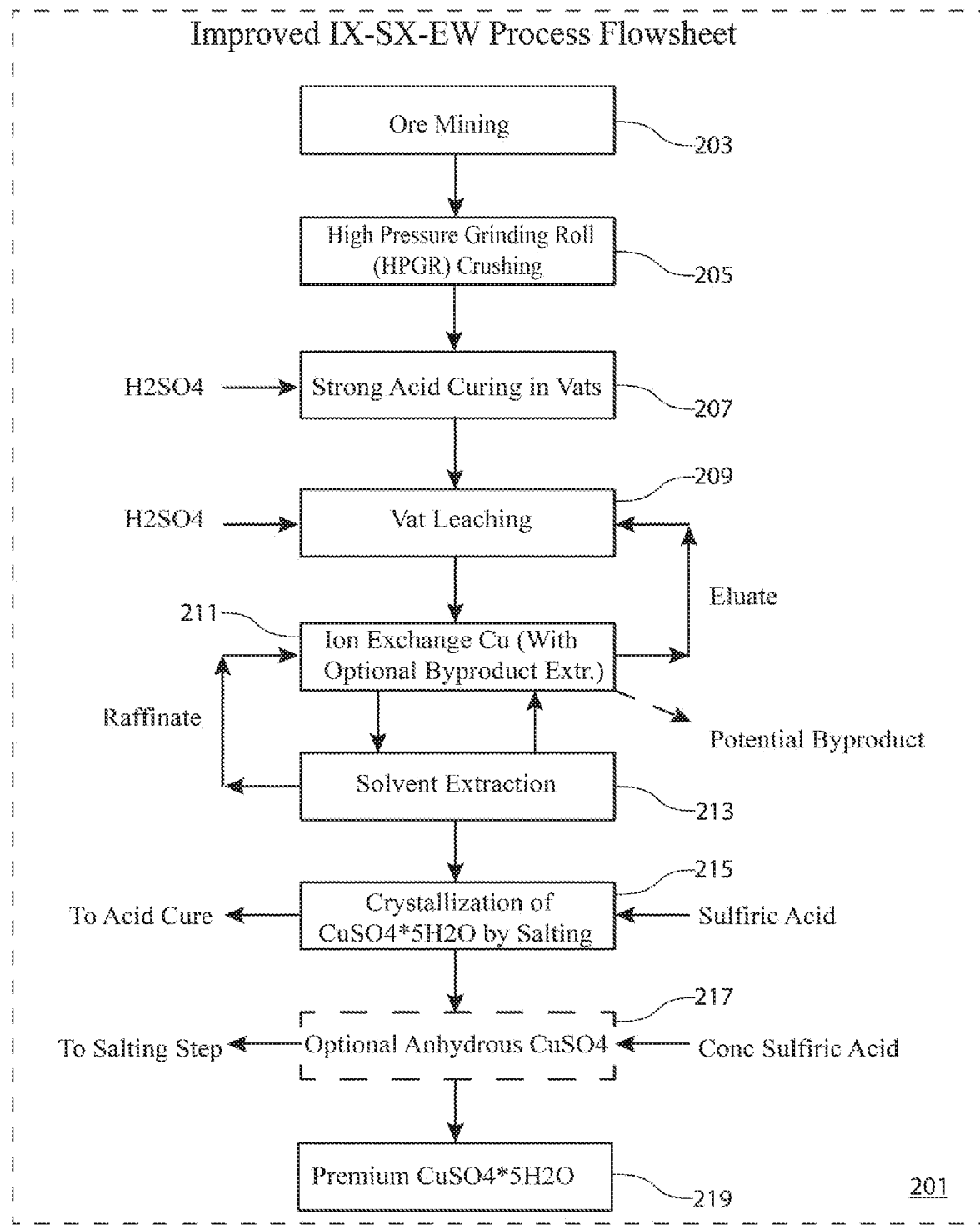
FIG. 2 is a flow chart depicting a first embodiment of a method for recovering copper values from low grade copper ores in accordance with the teachings herein.

It has now been found that the foregoing need may be met with the systems and methodologies disclosed herein. A particular, nonlimiting embodiment depicted of such a methodology is depicted in FIG. 2. With reference thereto, the method 201 commences with ore mining 203, which yields an ore feedstock. The ore feedstock may contain common copper oxide ores such as, for example, azurite, malachite, tenorite or chrysocolla.

The ore feedstock is subjected to size reduction via crushing 205. This preferably involves an initial crushing followed by high pressure grinding roll (HPGR) crushing. In HPGR crushing, two counter-rotating grinding rolls expose a column of material to high pressure, which is distributed across the gap between the rolls. The HPGR grinding process is a unique grinding method in that it results in interparticle comminution through crushing and grinding of ore particles within the compressed material bed (and not by contact with the roll surface). The feedstock material may be smaller than the gap between the grinding rolls, which distinguishes this approach from ordinary crushers. The high pressure comminution process causes micro-cracks in the particles, which lead to the liberation of minerals and a higher portion of fines. It has been found that HPGR treated minerals typically exhibit better leaching performance, because the micro-cracks increase the particle contact surface for the leaching liquid.

The ground ore is then subjected to strong acid curing 207 in one or more vats. This process preferably utilizes sulfuric acid, and is preferably followed by vat leaching 209 (again preferably using sulfuric acid), although in some embodiments, tank leaching may be used instead if a slimes separation step is included in the process flowsheet. Both tank and vat leaching involve placing the ground ore into large tanks or vats (at ambient or somewhat elevated temperature operating conditions) which contain a leaching solution, and then allowing the copper values to leach from the ore into solution. It is to be understood that, while the primary focus of the systems and methodologies disclosed herein is the recovery of copper values, the recovery of other metal values (such as, for example, base metals and/or scandium) which may be present in an ore feedstock is expressly contemplated, since the recovery of these products offers a further avenue to improving the overall economics of the process.

The leachate from the vat leaching step 209 (or in some embodiments, the tank leaching step after a solid-liquid separation step) is then passed through one or more ion exchange columns 211, which extract the copper values (and possibly other metal values) from the leachate. The resulting eluate may be utilized in the vat leaching step of subsequent iterations of the process. In some embodiments, the eluate may be subjected to one or more byproduct extraction steps, which may thus yield one or more byproducts. By way of example, the leachate may be passed through a first ion exchange column which is selective to copper, and then through a second ion exchange column which is selective to scandium or other metals (or vice versa).

The loaded ion exchange resin is then stripped with a stripping solution, thus yielding a copper loaded stripping solution. The copper loaded stripping solution is then subjected to solvent extraction 213, thereby yielding an extract and a raffinate. The raffinate may be used as an in exchange stripping agent in subsequent iterations of the process.

Copper values may be crystallized 215 from the extract by salting, which preferably involves the addition of mildly concentrated sulfuric acid. Preferably, copper values are crystallized as hydrates of copper sulfate, and more preferably, as the pentahydrate of copper sulfate. The residual acid from the crystallization process may then be utilized in the strong acid curing step of subsequent iterations of the process.

In some embodiments of the process, anhydrous copper sulfate 217 may be generated. This will preferably occur by exposing the crystallized, hydrated copper sulfate to concentrated sulfuric acid. The residual acid from this step may be employed in the salting step of subsequent iterations of the process. The anhydrous copper sulfate thus generated may be rehydrated, if desired, to produce a premium copper sulfate hydrate 219, which is preferably the pentahydrate. While high quality copper sulfate can be produced in the event that the quality has to be further improved a simple redissolution and recrystallization unit operation can be warranted.

Figure 3:
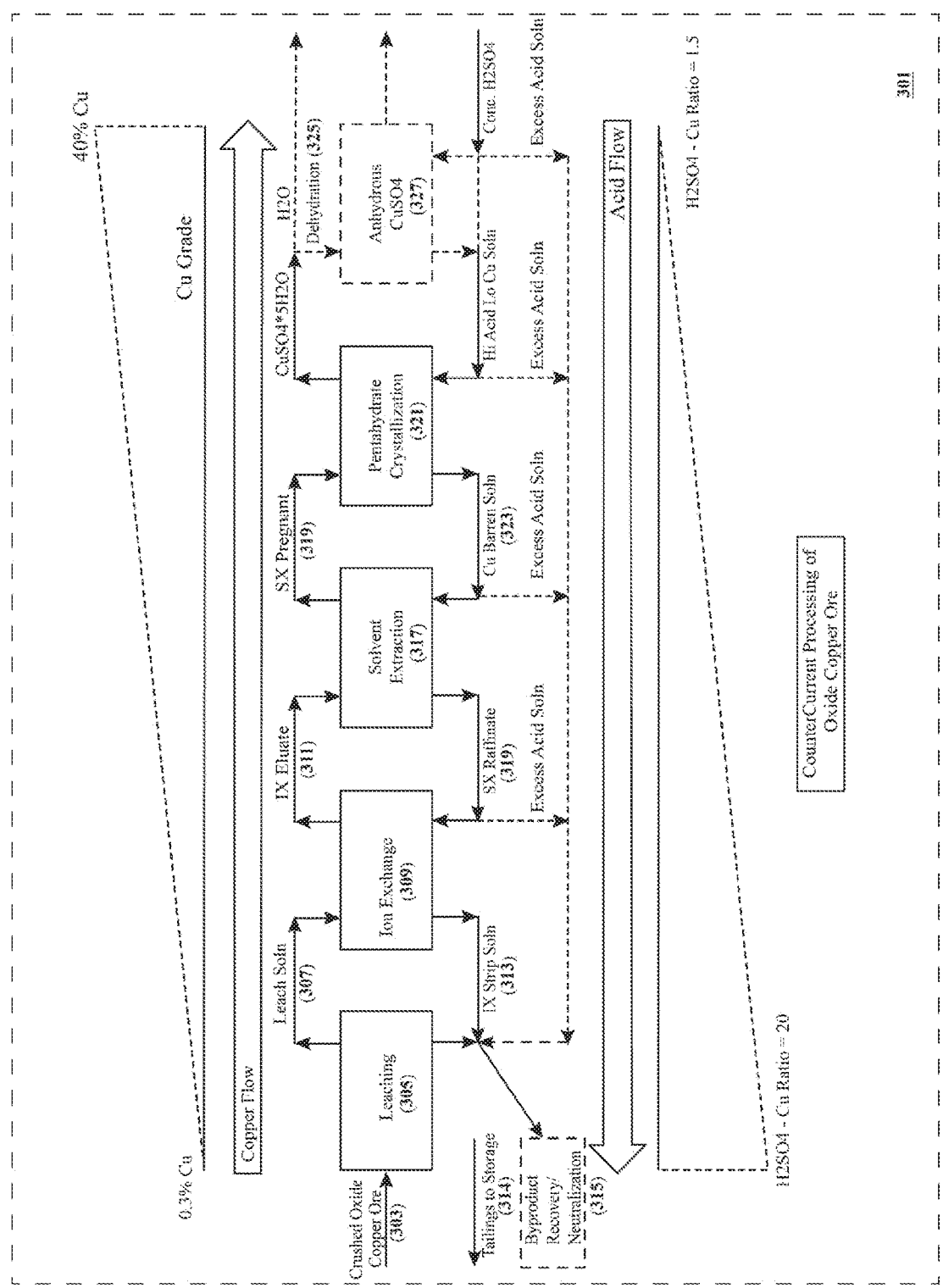
FIG. 3 is a flow chart depicting a first embodiment of a method for recovering copper values from low grade copper ores in accordance with the teachings herein.

FIG. 3 depicts another particular, nonlimiting embodiment of a methodology in accordance with the teachings herein. This embodiment is similar in many respects to the embodiment of FIG. 2, and comparable steps between the two embodiments may use the same or similar techniques, materials and equipment. However, the process of FIG. 3 utilizes a countercurrent technique in which the concentrations of copper and acid essentially move in opposite directions in the process (that is, the concentration of acid decreases in each subsequent process step, and the concentration of copper or other metal values increases in each subsequent process step). This embodiment further illustrates a highly efficient process for recycling acid from several of the processing steps to one or more previous processing steps in a subsequent iteration of the process. The resulting process may offer significantly lower overall acid consumption levels as well as higher copper extractions, thus making the process more economically viable. This is especially true when the resulting process is compared to conventional techniques in applications involving low grade copper oxide ores.

The process 301 in FIG. 3 begins with a feedstock of crushed ore 303. This feedstock may be generated, for example, from a mining operation in the manner described above with respect to the process of FIG. 2, or from another industrial process which gives rise to a suitable crushed ore feedstock. The feedstock is then subjected to leaching 305 with sulfuric acid, thus generating a leachate 307 and tailings. The tailings are subjected to suitable disposal or storage 314.

The leachate 307 is then subjected to an ion exchange process 309 to remove copper and other desirable minerals from it. Such other minerals may include, without limitation, scandium, cobalt, zinc, or nickel. It will be appreciated that the ion exchange process may comprise multiple steps, and that specific resins and solvents may be utilized in each step of the ion exchange process 309 to target specific metal values. The ion exchange process 309 yields at least one ion exchange eluate 311 and at least one ion exchange strip solution 313. The ion exchange strip solution 313 may be utilized in the leaching step 305 of subsequent iterations of the process, and may possibly be subjected to byproduct recovery and neutralization 315.

The at least one ion exchange eluate 311 which is then subject to solvent extraction 317. The raffinate 319 from the solvent extraction process may be utilized in the at least one ion exchange step 309 of subsequent iterations of the process.

The solvent extraction process 317 yields a pregnant solvent extraction solution 319 which is then subjected to pentahydrate crystallization 321. The copper barren solution 323 resulting from the pentahydrate crystallization 321 may be utilized in the solvent extraction step 317 of subsequent iterations of the process.

The pentahydrate crystallization 321 yields copper pentahydrate, which is then subjected to dehydration 325 to produce anhydrous copper sulfate 327. The resulting high acid, low copper solution 329 from the dehydration step 325 may be utilized in the pentahydrate crystallization step 321 of subsequent iterations of the process.

It is to be noted that the ion exchange step 309, the solvent extraction step 317, the pentahydrate crystallization step 321, and the dehydration step 325 of the process 301 may all yield excess acid at various times. This excess acid may be collected and reused in the leaching step 305 to further reduce overall acid consumption by the process 301.

Although the foregoing process has been exemplified with respect to the recovery of copper and/or scandium from copper oxide ores, one skilled in the art will appreciate that this approach, with suitable modifications, may be applied to the recovery of various other metal values, either alone or in various combinations. Such other metal values include, but are not limited to, lithium, vanadium, titanium and nickel.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for extracting copper values from a low grade copper ore feedstock, comprising:
    providing an ore feedstock of a copper oxide ore;
    subjecting the ore feedstock to at least one process selected from the group consisting of primary crushing processes and secondary crushing processes, thereby obtaining crushed ore;
    subjecting the crushed ore to acid curing, thereby obtaining a cured ore;
    subjecting the cured ore to vat or heap leaching, thus yielding a leachate containing copper and base metals;
    passing the leachate through a first ion exchange resin which is selective to base metals and copper, thereby removing a portion of the copper and a portion of the base metals from the leachate and yielding a first loaded resin and a first treated leachate;
    stripping the base metals and the copper from the first loaded resin with a first stripping solution, thereby yielding a copper-loaded stripping solution;
    selectively extracting copper values from the stripping solution via solvent extraction, thereby obtaining a copper bearing extract and a raffinate; and
    crystallizing a copper salt from the copper bearing extract, thereby obtaining a crystallized copper salt.

2. The method of claim 1, wherein the crystallized copper salt is copper sulfate, and wherein crystallizing a copper salt from the extract includes adding sulfuric acid to the extract.

3. The method of claim 1, wherein the stripping solution contains an acid.

4. The method of claim 1, wherein crystallizing a copper salt from the extract includes crystallizing a copper sulfate hydrate from the extract, and wherein the copper sulfate hydrate has the general formula $CuSO_4 \cdot XH_2O$.

5. The method of claim 4, wherein crystallizing a copper salt from the extract includes crystallizing $CuSO_4 \cdot XH_2O$ from the extract.

6. The method of claim 4, further comprising;
    isolating the crystallized copper sulfate, thereby obtaining isolated copper sulfate; and
    treating the isolated copper sulfate with concentrated sulfuric acid, thereby obtaining an anhydrous copper sulfate.

7. The method of claim 6, wherein treating the isolated copper sulfate with concentrated sulfuric acid yields anhydrous copper sulfate and a first portion of used sulfuric acid, and further comprising:
    completing first and second iterations of the method of claim 6; and
    using the first portion of used sulfuric acid from the first iteration in the solvent exchange step of the second iteration of the method, using the raffinate from the first iteration in the first stripping solution of the second iteration of the method, and using the first treated leachate from the first iteration in the acid curing step of the second iteration of the method.

8. The method of claim 1, further comprising:
    completing first and second iterations of the method of claim 1; and using the treated leachate from the first iteration of the method in the vat or heap leaching step of the second iteration of the method.

9. The method of claim 1, further comprising:
completing first and second iterations of the method of claim 1; and
using the raffinate from the first iteration of the method in the step of passing the leachate through an ion exchange resin in the second iteration of the method.

10. The method of claim 1, further comprising:
passing the first treated leachate through a second ion exchange resin which is selective to scandium, thereby removing a portion of the scandium values from the first treated leachate and yielding a second loaded resin and a second treated leachate;
stripping scandium values from the second loaded resin with a stripping solution, thereby yielding a scandium-loaded stripping solution; and
extracting scandium values from the scandium-loaded stripping solution via solvent extraction.

11. The method of claim 1, further comprising:
subjecting the ore feedstock to high pressure grinding roll crushing, thereby obtaining a crushed ore.

12. The method of claim 1, wherein subjecting the crushed ore to acid curing includes treating the ore with sulfuric acid.

13. A method for extracting copper values from a copper ore feedstock, comprising:
providing an ore feedstock of a low grade crushed copper oxide ore; and
recovering copper values from the ore feedstock by the sequence of steps of
(A) leaching,
(B) ion exchange,
(C) solvent extraction, and
(D) crystallization;
wherein step (A) generates a product having a higher wt % of copper than the ore feedstock;
wherein each of steps (B)-(D) generates a product having a higher wt % of copper than the previous step in the sequence of processing steps; and
wherein each of steps (B)-(D) comprises the creation of an acid solution having a lower ratio $w_a/w_{Cu}$ than the previous step in the sequence of processing steps, where $w_a$ is the wt % acid and $w_{Cu}$ is the wt % copper in the acid solution generated, and further comprising using an acid solution generated by each of steps (B)-(D) in a leaching step of a subsequent iteration of the method.

14. The method of claim 13, further comprising:
subjecting the crushed ore to sulfuric acid curing, thereby obtaining a cured ore; and
subjecting the cured ore to vat or heap leaching, thus yielding a leachate.

15. The method of claim 14, further comprising:
passing the leachate through a first ion exchange resin which is selective to base metals plus copper, thereby removing a portion of the base metals and copper values from the leachate and yielding a first loaded resin and a first treated leachate.

16. The method of claim 15, further comprising:
stripping copper values from the first loaded resin with a first stripping solution, thereby yielding a copper-loaded stripping solution.

17. The method of claim 16, further comprising:
selectively extracting copper values from the copper-loaded stripping solution via solvent extraction, thereby obtaining an extract and a raffinate.

18. The method of claim 17, further comprising:
crystallizing a copper salt from the extract, thereby obtaining a crystallized copper salt.

19. The method of claim 18, wherein the crystallized copper salt is copper sulfate, and wherein crystallizing a copper salt from the extract includes adding sulfuric acid to the extract.

20. The method of claim 16, wherein the stripping solution contains sulfuric acid.

21. The method of claim 18, wherein crystallizing a copper salt from the extract includes crystallizing a copper sulfate hydrate from the extract, and wherein the copper sulfate hydrate has the general formula $CuSO_4 \cdot XH_2O$.

22. The method of claim 18, wherein crystallizing a copper salt from the extract includes crystallizing $CuSO_4 \cdot XH_2O$ from the extract.

23. The method of claim 18, further comprising;
isolating the crystallized copper sulfate, thereby obtaining isolated copper sulfate; and
treating the isolated copper sulfate with concentrated sulfuric acid, thereby obtaining an anhydrous copper sulfate.

24. The method of claim 18, wherein treating the isolated copper sulfate with concentrated sulfuric acid yields anhydrous copper sulfate and a first portion of used sulfuric acid, and further comprising:
using the first portion of used sulfuric acid in the solvent exchange step of a subsequent iteration of the process, using the raffinate in the first stripping solution of a subsequent iteration of the process, and using the first treated leachate in the acid curing step of a subsequent iteration of the process.

25. The method of claim 18, further comprising using the treated leachate from a first iteration of the method in the vat or heap leaching step of a second iteration of the method.

26. The method of claim 18, further comprising using the raffinate from a first iteration of the method in the step of passing the leachate through an ion exchange resin in a second iteration of the method.

27. The method of claim 18, further comprising:
passing the first treated leachate through a second ion exchange resin which is selective to scandium, thereby removing a portion of the scandium values from the first treated leachate and yielding a second loaded resin and a second treated leachate;
stripping scandium values from the second loaded resin with a stripping solution, thereby yielding a scandium-loaded stripping solution; and
extracting scandium values from the scandium-loaded stripping solution via solvent extraction.

28. The method of claim 18, wherein the crystallized copper salt has the formula $CuSO_4 * 5H_2O$, and wherein recovering copper values from the ore feedstock further comprises the step of:
(E) dehydration by the addition of concentrated sulfuric acid, whereby the $CuSO_4 \cdot XH_2O$ is converted into $CuSO_4$.

* * * * *